Patented June 30, 1936

2,045,718

UNITED STATES PATENT OFFICE 2,045,718

METHOD OF PRODUCING ANHYDRIDES OF LOWER FATTY ACIDS

Richard Müller, Hans Hatzig, and Erich Rabald, Mannheim, Germany, assignors to C. F. Boehringer & Soehne G. m. b. H., Mannheim-Waldhof, Germany No Drawing. Application May 29, 1930, Serial No. 457,533. In Germany June 6, 1929

22 Claims. (Cl. 260—123)

Our invention relates to the production of acetic acid anhydride by thermic decomposition of acetic acid in the presence of a catalyst. It has further reference to the selection or preparation of the catalysts to be employed in this reaction with a view to improving the conditions under which this reaction takes place, and to increasing the yield of acetic acid anhydride.

The production of acetic acid anhydride by pyrogenetic decomposition of acetic acid vapors has already been carried through in the presence of catalysts. However the number of catalysts adapted for the carrying out of this reaction on a commercial scale was comparatively small. This is due amongst others to the fact that this reaction is not of a simple character, but is composed of a sequence of reactions which occur synchronously or successively, and which may lead to altogether different products, so that the catalytic substances used for accelerating the reaction must be selected with a view to their most favorable action on the desired reaction, and substantially on this reaction only, so that secondary reactions are not promoted or are restrained.

Hitherto the production of acetic acid anhydride on a commercial scale by thermic decomposition of acetic acid was effected exclusively in the presence of substances which are enabled by their chemical constitution to induce and further such decomposition and which are therefore endowed with an activity, as far as this reaction is concerned, which the chemist is used to term catalytic, although hitherto no explanation has been given for this particular action of certain substances, amongst which are included certain metal oxides and salts such as the chlorides, phosphates and tungstates. As mentioned above, these catalysts are active by virtue of their substance, regardless of their physical characteristics, although their activity may vary greatly in proportion to the state of subdivision in which they are put to use. Thus these "chemical catalysts" will display an increased activity if finely distributed on a carrier such as pumice where they are enabled to come in most intimate contact with the vapors to be acted upon.

The other class of substances, which have been found to be capable, by their mere presence, of inducing and furthering reactions and which are termed "surface catalysts", need not and in many cases do not in any way act by virtue of their chemical constitution, but merely by their physical properties and quite especially by the large surface offered to the reacting substances. Amongst these "surface catalysts" range a number of gels, finely subdivided carbon, finely subdivided metals etc. Even such substances which are known to influence a reaction in an unfavorable way, may be converted into catalysts by having their surface developed in a suitable manner.

To these "surface catalysts" the present invention relates more particularly.

We have discovered that the efficiency of surface catalysts used in the production of acetic acid anhydride by thermic decomposition of acetic acid is not proportional to the area of their surface. While at first sight it appeared probable or even obvious that similar to other catalytical reactions the highest surface development, i. e. the largest possible surface area would be desirable in this reaction, our investigations have shown this not to be true. For instance, if silica gel or some other surface catalyst of a similar type is used in the reaction aforesaid, the catalytic effect exerted by such catalyst does not rise in proportion to its surface area. We have found that the optimum, as far as the yield, the quantity of the final product obtainable, the formation of undesirable by-products, the stability of the catalyst etc. are concerned, is obtained with a catalyst of gel structure, the surface activity of which (in the common sense) is not fully developed. By employing incompletely developed catalysts or by damping, tempering or repressing the development of the catalyst surface better results are obtained than with a surface which is developed to the highest feasible extent. We have found that catalysts having an incompletely developed surface will influence the reaction in such manner that even such substances, which were hitherto believed to be injurious to the thermic production of acetic acid anhydride from acetic acid, are not only rendered innocuous, but may even be converted into technically valuable catalysts.

The catalysts according to the present invention have been found to be particularly well suited for this reaction. We have further found that all substances, which are known to owe their high activity to the extremely high development of their surface, if treated in a manner adapted to modify their surface development in a moderating sense, will exert a superior catalytic effect on the acetic acid vapors. The treatment to which such substances may be subjected can vary within comparatively wide limits, but in every case the highly active surface of the catalysts must be modified in such manner that the product of such treatment is not what would be termed a surface catalyst in the state of highest surface development.

We may modify the surface development of such catalysts for instance by heating them to a temperature at which they start sintering or melting, the catalyst thus treated being comminuted, if desired, or by treating them with a caustic alkali, such as ammonia, or with an acid, such as hydrochloric acid; or we may impart to the substances, for instance metals such as platinum and palladium, the suitable form by depositing them on carriers which already have the suitable form.

In some cases a mass may be transformed from a coarse-porous to a fine-porous condition, as, for instance, silica gel precipitated from alkaline medium by heating and subsequent treatment with acids, whereby the surface is, so to speak, roughened and excellent catalysts are obtained.

We are not in a position at the present time to furnish a scientifically founded explanation for the fact, that by damping or repressing the surface development of a catalyst or, generally speaking, by employing or preparing for use a catalyst with an incompletely developed surface the efficiency of the reaction is increased. We believe that this effect may possibly be due to a blunting, dulling, sintering or fusing together of the microscopic projecting portions of the catalyst surface or to a partial clogging of its pores, but we wish to expressly state that this explanation is of a merely hypothetical character and should not be used to limit the scope of our claims.

We have ascertained the effect of a treatment such as described on surface catalysts by comparative tests. Thus for instance silica gel precipitated from an acid solution and which was capable of taking up at 0° C. chlorine up to 21% of its own weight was divided into several portions. One portion was treated with concentrated ammonia, another portion with hydrochloric acid. In both cases the gels thus treated were rinsed, dried and subjected to a short calcination. If the gels thus treated were subjected to tests in comparison with the original untreated gel, these tests being carried out at a temperature of about 700° C., the following results were obtained:

(1) The untreated gel having a chlorine adsorption of 21% yielded 35% acetic acid anhydride; the quantity of anhydride formed per hour and per litre of catalyst space was 9.5 kgs.; the quantity of acetic acid anhydride, which could be produced with 1 kg. of the catalyst, before a regeneration became necessary, was 310 kgs.

(2) The portion of the catalyst which was treated with ammonia, showed a chlorine adsorption of 1% and yielded 40% acetic acid anhydride and 12.3 kgs. per hour and litre of catalyst space. 700 kgs. anhydride could be produced with 1 kg. of the catalyst before regeneration became necessary.

(3) The portion of the catalyst treated with hydrochloric acid and showing a chlorine adsorption of 14.5% yielded 51% acetic acid anhydride and 16.5 kgs. per hour and litre catalyst space. 370 kgs. anhydride could be produced with 1 kg. of the catalyst before regeneration became necessary.

The regeneration of the catalysts can be readily effected by calcination in air or oxygen or with steam, either alone or combined with air.

Obviously the tests recited above must not be read as being directed to the obtention of the highest possible yields, but were merely designed to illustrate the difference in efficiency.

Further tests carried out with catalysts subjected to the same treatment gave the following results:

Example 1

Silica gel produced by decomposing silicon tetrachloride with water and drying at 150° C., when used as a catalyst in the thermic decomposition of acetic acid, yielded under certain conditions of operation 30.4% acetic acid anhydride.

The same gel after having been allowed to stand with concentrated ammonia for 72 hours, when used in the same reaction under the same conditions of operation, yielded 36.9% acetic acid anhydride.

Example 2

A gel precipitated from water glass by concentrated hydrochloric acid yielded 34.7% acetic acid anhydride. After 72 hours' treatment with concentrated ammonia the yield rose to 39.2%. After having been treated during 24 hours with concentrated hydrochloric acid, the yield rose to 51.1%.

Example 3

The thermic decomposition of acetic acid was carried out with aluminium oxide gels of different activity and the following results were obtained.

(a) When the highly active gels described by Willstätter and Kraut (Berichte der Deutschen Chemischen Gesellschaft, vol. 56, page 149) and marked by them A, B and C were used in the thermic decomposition of acetic acid, yields of 15, 18, and 21% of the anhydride and losses of 18, 22, and 20%, respectively, were obtained. Of the highly active gels here used the modification A was obtained by heating aluminium sulfate with the ten-fold quantity of water, gradually introducing the solution into the threefold quantity of a 20% aqueous solution of ammonia heated to 50°, slowly passing steam through the solution, separating the solution from the precipitate, freeing the alumina from the mother liquor by washing with water, heating it 48 hours under the reflux condenser with 5 litres ammonia of 20% and carefully washing the aluminium hydroxide thus produced.

The modification B was produced by introducing the boiling solution of aluminium sulfate under very vigorous stirring into the 10-fold quantity of ammonia of 20% heated to 50° C., the temperature rising to 70° C. Stirring is continued for another 1½ hours, while the temperature drops to 60° C. The sulfate liquor is now displaced with fresh ammonia by decantation and the precipitate heated in the ammonia 30 minutes to 60° C. under vigorous stirring. After cooling the suspension is carefully washed out with water.

The modification C was obtained by diluting 1.5 litres ammonia of 20% with 6 litres water heated to 70° C. and pouring into the solution under very vigorous stirring the solution, heated to 65° C., of 500 grams aluminium sulfate in 1.5 litres water. The aluminium hydroxide settling down in the liquor is freed from the mother liquor by repeated washing with water and introduced into 4 litres ammonia of 4% heated to 70° C. The alumina is carefully washed with water.

(b) A gel D obtained according to Willstätter and Kraut's method, which represents a form of aluminium oxide gel, the surface development of which has not been completed, yielded 28% anhydride with comparatively scanty losses. This gel was obtained by dissolving 130 grams pure aluminium hydroxide and 140 grams caustic potash of 80% in 900 cubic centimetres hot water, filtering and diluting with water to obtain 10 litres. Precipitation is effected by slowly passing carbonic acid gas through the solution during 48 hours. The precipitating alumina is freed from the mother liquor by decanting, repeated washing with water containing carbonic acid and with distilled water.

This gel and the gels A, B, and C were dried in vacuo in the exsiccator.

(c) When gel B was heated on the water bath with a 40% hydro-fluoric acid and then rinsed, a gel was obtained, the surface development of which was disturbed. This gel, if used in the reaction under the same conditions as above, produced 23.6% acetic acid anhydride with 6% losses.

(d) Aluminum oxide, molten in the electric arc, when used in a catalyst, induced a formation of not more than 5.7% acetic acid anhydride.

*Example 4*

Spongy platinum is described in Gmelin (Handbuch der organischen Chemie, 4th edition, Vol. I page 624) as decomposing acetic acid anhydride at higher temperature into gaseous products. If platinum foil is used as a catalyst, 13.6% acetic acid anhydride are obtained. With platinum wire netting 15.5% are formed. If the platinum is precipitated on a gel, not less than 45% acetic acid anhydride are formed under the same conditions.

These tests show that our invention is applicable to surface catalysts of a widely varying character and that we are justified in assuming that the increase in efficiency is in fact due to a change in the surface configuration of the catalyst, which is not proportional to its surface area.

The term "incomplete surface development" as used in the claims appended to this specification, is intended to designate a formation, in which a material having the characteristics of a true surface catalyst is not in its most highly active form in the common sense. It does not matter whether the incompletely developed surface was obtained from the more highly developed or from the less highly developed form.

Various changes may be made in the details disclosed in the foregoing specification without departing from the invention or sacrificing the advantages thereof.

We claim:—

1. The method of producing acetic acid anhydride comprising subjecting acetic acid vapors to a thermic treatment in the presence of a catalytically active solid gel which at 0° C., adsorbs less than 21% chlorine.

2. The method of producing acetic acid anhydride comprising subjecting acetic acid vapors to a thermic treatment in the presence of a catalytically active solid silica gel which at 0° C. adsorbs less than 21% chlorine.

3. The method of producing acetic acid anhydride comprising subjecting acetic acid vapors to a thermic treatment in the presence of silica gel which at 0° C. adsorbs less than 21% chlorine.

4. The method of producing acetic acid anhydride comprising subjecting acetic acid vapors to a thermic treatment in the presence of aluminium oxide gel which at 0° C. adsorbs less than 21% chlorine.

5. The method of producing acetic acid anhydride comprising subjecting acetic acid vapors to a thermic treatment in the presence of a catalytically active solid gel which at 0° C. adsorbs less than 21% chlorine and has a catalytically active substance deposited thereon.

6. The method of producing acetic acid anhydride comprising subjecting acetic acid vapors to a thermic treatment in the presence of a catalytically active solid gel which at 0° C. adsorbs less than 21% chlorine and has a catalytically active metal of the group consisting of platinum and palladium deposited thereon.

7. The method of producing acetic acid anhydride comprising subjecting acetic acid vapors to a thermic treatment in the presence of a catalytically active solid gel which at 0° C. adsorbs less than 21% chlorine and has platinum deposited thereon.

8. The method of producing acetic acid anhydride comprising subjecting acetic acid vapors to a thermic treatment in the presence of silica gel which at 0° C. adsorbs less than 21% chlorine and has a catalytically active substance deposited thereon.

9. The method of producing acetic acid anhydride comprising subjecting acetic acid vapors to a thermic treatment in the presence of silica gel which at 0° C. adsorbs less than 21% chlorine and has platinum deposited thereon.

10. The method of producing acetic acid anhydride comprising subjecting acetic acid vapors to a thermic treatment in the presence of a catalytically active solid gel which has been treated for a reduction of its surface development until its capacity for adsorbing chlorine at 0° C. is less than 21%.

11. The method of producing acetic acid anhydride comprising subjecting acetic acid vapors to a thermic treatment in the presence of a catalytically active solid gel which has been treated with caustic alkali for a reduction of its surface development until its capacity for adsorbing chlorine at 0° C. is less than 21%.

12. The method of producing acetic acid anhydride comprising subjecting acetic acid vapors to a thermic treatment in the presence of a catalytically active solid gel which has been treated with an acid for a reduction of its surface development until its capacity for adsorbing chlorine at 0° C. is less than 21%.

13. The method of producing acetic acid anhydride comprising subjecting acetic acid vapors to a thermic treatment in the presence of a catalytically active solid gel which has been treated with hydrochloric acid for a reduction of its surface development until its capacity for adsorbing chlorine at 0° C. is less than 21%.

14. The method of producing acetic acid anhydride comprising subjecting acetic acid vapors to a thermic treatment in the presence of a catalytically active solid gel heated to beginning sintering temperature until its capacity for adsorbing chlorine at 0° C. is less than 21%.

15. The method of producing acetic acid anhydride comprising subjecting acetic acid vapors to a thermic treatment in the presence of silica gel treated for a reduction of its surface development until its capacity for adsorbing chlorine at 0° C. is less than 21%.

16. The method of producing acetic acid anhydride comprising subjecting acetic acid vapors to a thermic treatment in the presence of silica gel treated with caustic alkali for a reduction of its surface development until its capacity for adsorbing chlorine at 0° C. is less than 21%.

17. The method of producing acetic acid anhydride comprising subjecting acetic acid vapors to a thermic treatment in the presence of silica gel treated with an acid for a reduction of its surface development until its capacity for adsorbing chlorine at 0° C. is less than 21%.

18. The method of producing acetic acid anhydride comprising subjecting acetic acid vapors to a thermic treatment in the presence of silica gel treated with hydrochloric acid for a reduction of its surface development until its capacity for adsorbing chlorine at 0° C. is less than 21%.

19. The method of producing acetic acid anhydride comprising subjecting acetic acid vapors to a thermic treatment in the presence of silica gel produced by acting with an acid on a silicon compound and whose capacity for adsorbing chlorine at 0° C. is less than 21%.

20. The method of producing acetic acid anhydride comprising subjecting acetic acid vapors to a thermic treatment in the presence of silica gel produced by acting with hydrochloric acid on a silicate and whose capacity for adsorbing chlorine at 0° C. is less than 21%.

21. Process for the manufacture of an aliphatic anhydride which comprises thermally decomposing the vapor of a lower fatty acid in the presence of silica gel.

22. Process for the manufacture of acetic anhydride which comprises thermally decomposing the vapor of acetic acid in the presence of silica gel.

RICHARD MÜLLER.
HANS HATZIG.
ERICH RABALD.